United States Patent [19]
Murphy

[11] Patent Number: 5,332,509
[45] Date of Patent: Jul. 26, 1994

[54] CHEMICAL PROCESS FOR REMOVING ORGANOMETALLIC COMPOUNDS FROM WATER

[75] Inventor: Andrew P. Murphy, Littleton, Colo.

[73] Assignee: The United States of America as represented by the Secretary of the Interior, Washington, D.C.

[21] Appl. No.: 21,437

[22] Filed: Feb. 24, 1993

[51] Int. Cl.$^5$ ................................. C02F 1/62
[52] U.S. Cl. ..................... 210/719; 204/150; 210/723; 210/757; 210/908; 210/912
[58] Field of Search .............. 210/702, 715, 719, 720, 210/723, 724, 912–914, 757, 908; 204/150, 152

[56] References Cited

U.S. PATENT DOCUMENTS

| | | | |
|---|---|---|---|
| 3,697,567 | 10/1972 | Taylor | 210/702 |
| 3,766,036 | 10/1973 | McKaveney | 210/723 |
| 4,096,064 | 6/1978 | du Fresne | 210/120 |
| 5,089,141 | 2/1992 | Murphy | 210/719 |
| 5,133,873 | 7/1992 | Catlin et al. | 210/912 |

*Primary Examiner*—Peter A. Hruskoci
*Attorney, Agent, or Firm*—E. Philip Koltos

[57] ABSTRACT

A chemical process for selectively removing organometallic compounds from water supplies. The process utilizes a combination of a transition metal selected from the group consisting of nickel, copper, iron and zinc, and an electropositive metal selected from the group consisting of magnesium and aluminum to effectively remove organometallic compounds from water whether present in ionic or non-ionic form.

6 Claims, No Drawings

CHEMICAL PROCESS FOR REMOVING ORGANOMETALLIC COMPOUNDS FROM WATER

FIELD OF THE INVENTION

The invention relates to a process for the treatment of water contaminated with organometallic compounds and, particularly, to a chemical process for the removal of organometallic compounds from water supplies. More particularly, the invention relates to a chemical process for the selective removal of organometallic compounds from water.

DESCRIPTION OF THE PRIOR ART

The importance of removing pollutants from water has gained increasing popular support with the recognition of their potential for harm to humans, birds, and fish, as well as to livestock and agriculture. In an effort to protect against these harms, Congress and state legislatures have enacted stringent federal and state laws concerning water pollution, including maximum levels of various pollutants, in drinking water and water for release to ground systems.

Typical of prior art techniques for treating contaminated water are the methods disclosed by Murphy in U.S. Pat. Nos. 4,806,264 and 5,089,141. Both patents are directed to the removal of selenium, a non-metal, which in high levels is detrimental to human health and toxic to birds and fish and other marine life. However, the patents make no suggestion concerning the treatment of water supplies contaminated with organometallic compounds.

Hayashi et al in U.S. Pat. No. 4,599,177 disclose a chemical process for removing mercury, including organomercury compounds, from waste water. The process involves the use of reducing agents, such as powders of metals such as iron, zinc, magnesium, tin and aluminum. While the patent discloses that in some cases better results are obtained by using two or more reducing agents in combination, there is no specific teaching to use any particular combination of reducing agents or that organometallic compounds other than organomercury compounds may be removed.

DuFresne in U.S. Pat. No. 4,096,064 teaches a chemical process for removing heavy metal ions from water. The patent is not concerned with the removal of non-ionic or organometallic compounds.

Gauchon in U.S. Pat. No. 4,379,082 discloses a chemical process for removing ruthenium from radioactive effluents such as aqueous solutions obtained from the processing of irradiated nuclear fuels by adding a reducing agent and copper ions. The principal reducing agent disclosed is hydrazine and the only other reducing agent disclosed is hydroxylamine. There is no suggestion that ruthenium is present in non-ionic or organometallic form.

McKaveney in U.S. Pat. No. 3,766,036 is concerned with the removal of metals in ionic form only. The removal is accomplished by using an alloy which employs silicon, a non-metal, as an essential element.

It is clear from a review of the prior art processes for removing organometallic compounds from water systems that they are attended by many disadvantages and that there is significant room for improvement. While many of the organometallic compounds found in water are ionic and could be removed by the use of conventional desalting techniques such as ion exchange, reverse osmosis, or electrodialysis, such techniques are attended by the significant disadvantage of lack of specificity for organometallic compounds relative to other ions present in the water. Depending on the water to be treated, such techniques may result in an unacceptable high cost because instead of the removal of one trace constituent, all or most ions must be removed. Desalting processes would result in a brine stream greater in concentration of organometallic compounds than the influent stream, thereby compounding the problem of toxicity. In addition, large volumes of brine waste would be produced which would magnify problems associated with disposal.

Where the organometallic compounds found in water are non-ionic, conventional desalting techniques are wholly ineffective to bring about removal. Use of adsorption beds, e.g., activated carbon, may effect removal, but their use is attended by the disadvantage of having to operate an additional process for organometallic compound control in series with the chosen desalting process. The resultant increase in cost tends to make the operation prohibitive.

SUMMARY OF THE INVENTION

The invention comprises an improved chemical process for the treatment of water supplies contaminated with organometallic compounds. An essential feature of the invention is the treatment of water with a combination of a transition metal selected from the group consisting of nickel, copper, iron and zinc, and an electropositive metal selected from the group consisting of magnesium and aluminum. The metals are employed preferably in powder form, either separately or combined as an alloy or as a mixture, and may be contained in a column through which organometallic compound-containing water is pumped. The inventive process is characterized by the removal of organometallic compounds present in the water either in ionic or non-ionic form. This suggests significant advantages over prior art processes in the nature of lower capital costs and lower operating costs. The inventive process is also characterized by selective removal of organometallic compounds, thereby providing an economic advantage over such conventional desalting techniques as ion exchange, reverse osmosis, and electrodialysis. A further advantage is the fact that the process adds no heavy metal ions to the effluent water and effects a quantitative reduction in brine waste, thus alleviating any disposal problem. Still another advantage of the inventive process is the reduction in the number of unit operations that normally would be required to remove the organometallic compounds, i.e., normally such removal would employ both desalting and adsorption operations in series.

OBJECTS OF THE INVENTION

Accordingly, a principal object of the invention is to provide an improved process for the treatment of water contaminated with organometallic compounds.

Another object of the invention is to provide an improved chemical process for the removal of organometallic compounds from water supplies.

A further object of the invention is to provide an improved chemical process for the selective removal of organometallic compounds from water supplies characterized by the removal of organometallic compounds in both ionic and non-ionic form.

Still another object of the invention is to provide an improved chemical process for the selective removal of organometallic compounds from water supplies which utilizes a combination of a transition metal selected from the group consisting of nickel, copper, iron and zinc, and an electropositive metal selected from the group consisting of magnesium and aluminum.

Other objects and advantages of the invention will be apparent to those skilled in the art upon reference to the following detailed description and the specific examples.

DETAILED DESCRIPTION AND SPECIFIC EMBODIMENTS

A number of samples of various organometallic compounds were prepared for the purpose of testing the inventive concept. The information pertaining to these samples is provided in Table I.

TABLE I

| Sample Number | Organometallic Compound | Initial Concentration |
| --- | --- | --- |
| 1 | sodium salt of cacodylic acid | 9.1 mg/l As |
| 2 | p-arsanilic acid | 10.2 mg/l As |
| 3 | 2-[4,5-dihydroxy-2,7-disulfo-3-naphthylazo]-benzenearsonic acid, trisodium salt | 7.15 mg/l As |
| 4 | (2,2-[1,8 dihydroxy-3,6-disulfo-2,7-naphthalene-bis(azo)]-dibenzenearsonic acid) sodium salt | 8.28 mg/l As |
| 5 | o-arsanilic acid | 10.2 mg/l As |
| 6 | metallothionein I | 2.44 mg/l Cd |
|   |   | 0.317 mg/l Zn |
| 7 | metallothionein II | 3.24 mg/l Cd |
|   |   | 0.455 mg/l Zn |

A 20 ml solution of each of the samples in Table I was mixed with 1 gram samples of each metal in the powder combinations employed to test the inventive concept and allowed to react overnight (about 12 hours). 0.45 micron filtered samples were analyzed within 8 hours after sample collection for metals.

The results of the analyses of the various samples are set out in Table II.

TABLE II

| Sample Number | Metal Powder Combination | Final Concentration | Percent Removal |
| --- | --- | --- | --- |
| 1 | Cu—Al | 6.02 mg/l As | 34 |
|   | Ni—Al | 5.52 mg/l As | 40 |
|   | Fe—Al | 6.09 mg/l As | 33 |
|   | Zn—Al | 5.12 mg/l As | 44 |
| 2 | Ni—Al | 1.10 mg/l As | 89 |
|   | Fe—Al | 0.13 mg/l As | 99 |
|   | Zn—Al | 0.10 mg/l As | 99 |
| 3 | Zn—Mg | 0.046 mg/l As | 100 |
|   | Fe—Al | 0.056 mg/l As | 100 |
|   | Zn—Al | 0.030 mg/l As | 100 |
| 4 | Cu—Mg | 0.6 mg/l As | 93 |
|   | Ni—Al | 0.03 mg/l As | 100 |
|   | Fe—Al | 0.03 mg/l As | 100 |
|   | Zn—Al | 0.05 mg/l As | 99 |
| 5 | Cu—Al | 1.10 mg/l As | 89 |
|   | Zn—Mg | 0.94 mg/l As | 91 |
|   | Fe—Al | 0.05 mg/l As | 100 |
|   | Zn—Al | 0.05 mg/l As | 100 |
| 6 | Cu—Al | 0.004 mg/l Cd | 100 |
|   |   | 0.004 mg/l Zn | 100 |
|   | Cu—Mg | 0.005 mg/l Cd | 100 |
|   |   | 0.004 mg/l Zn | 100 |
|   | Ni—Al | 0.068 mg/l Cd | 97 |
|   |   | 0.004 mg/l Zn | 100 |
| 7 | Cu—Al | 0.004 mg/l Cd | 100 |
|   |   | 0.004 mg/l Zn | 100 |

TABLE II-continued

| Sample Number | Metal Powder Combination | Final Concentration | Percent Removal |
| --- | --- | --- | --- |
|   | Cu—Mg | 0.033 mg/l Cd | 99 |
|   |   | 0.004 mg/l Zn | 100 |
|   | Ni—Al | 0.013 mg/l Cd | 100 |
|   |   | 0.004 mg/l Zn | 100 |

As indicated heretofore, organometallic compound-laden waters could be pumped through a column containing a mix of the metal powders employed in the inventive process. Larger particles may be preferred in the one case for faster settling rates. In another case, very fine particles may be preferred because of more surface area and faster reaction rates.

It is also contemplated that the pH may be varied for different water systems and different metal powder combinations than those given in the examples may be employed. It should further be noted that the inventive process may be employed in water systems containing nitrate and that removal of such nitrate may be an attendant advantage of the inventive process. Also within the scope of the invention is the use of the inventive process to effect organometallic compound removal from non-aqueous systems.

The regeneration of the metal powder bed may be accomplished by the use of either acid, base or organic solvent. Oxidizing or reducing agents may be found useful to regenerate the bed too. Heating of the metal powder bed may be found to remove the organometallic compounds. If nickel or iron are chosen for the transition metal, a magnetic field could be used to separate same from the electropositive metal to aid in the removal of organometallic compounds from the bed. It is also contemplated that the effective removal of organometallic compounds from water supplies may be enhanced by the employment of more than one of the cited transition metals and/or more than one of the electropositive metals.

Additional embodiments and advantages within the scope of the claimed invention will be apparent to those skilled in the art.

What is claimed is:

1. In a chemical process for selectively removing organometallic compounds from water supplies where said organometallic compounds contain an element selected from the group consisting of arsenic, cadmium and zinc, the improvement comprising adding to said water supplies, a combination of metals consisting of a transition metal selected from the group consisting of nickel, copper, iron and zinc, and an electropositive metal selected from the group consisting of magnesium and aluminum, one gram of each metal in said combination being added to about 20 mL of said water supplies to react with said organometallic compounds, and removing said organometallic compounds and said combination of metals from said water supplies.

2. A process according to claim 1 wherein said metals are in powder form.

3. A process according to claim 1 wherein said metals are combined as an alloy.

4. A process according to claim 3 wherein said alloy is in powder form.

5. A process according to claim 1 wherein said transition metal and said electropositive metal are contained in a column and said combination of metals is added by passing said water supplies through said column.

6. A process according to claim 1 wherein the organometallic compounds are in the form of ionic and non-ionic compounds.

* * * * *